United States Patent [19]

Tokuhara

[11] 4,455,577
[45] Jun. 19, 1984

[54] ORIGINAL READER

[75] Inventor: Mitsuhiro Tokuhara, Chigasaki, Japan

[73] Assignee: Canon Kabushiki Kaisha, Tokyo, Japan

[21] Appl. No.: 407,472

[22] Filed: Aug. 12, 1982

[30] Foreign Application Priority Data

Aug. 21, 1981 [JP] Japan .................... 56-131088

[51] Int. Cl.³ .............................................. H04N 1/10
[52] U.S. Cl. ................................. 358/294; 358/293
[58] Field of Search .................... 358/293, 294, 285

[56] References Cited

U.S. PATENT DOCUMENTS

| | | | |
|---|---|---|---|
| 3,994,582 | 11/1976 | Goshima | 355/75 |
| 4,124,296 | 11/1978 | Kishi | 355/75 |
| 4,314,283 | 2/1982 | Kramer | 358/294 |
| 4,321,627 | 3/1982 | Hooker | 358/293 |

*Primary Examiner*—Howard W. Britton
*Attorney, Agent, or Firm*—Fitzpatrick, Cella, Harper & Scinto

[57] ABSTRACT

An original reader for image formation is disclosed. The original reader receives the reflected light from an original placed on a transparent original table and illuminated through the original table. According to the invention, the original table is provided with a light diffusive member. When an original of high regular reflectance is to be read, the original is placed on the original table through the light diffusive member so that the reader can read the original of high regular reflectance such as characters, figures etc. written on a mirror surface, an aluminum plate or the like.

4 Claims, 8 Drawing Figures

ORIGINAL READER

BACKGROUND OF THE INVENTION

1. Field of the Invention

The present invention relates to an original reader for use in an image-forming apparatus and more particularly to such original reader which is able to read even those originals having high regular reflectance.

2. Description of the Prior Art

At present there are many types of apparatus which include an original reader for reading an original illuminated by illumination means. A typical example of such apparatus is an image-forming apparatus such as copying machine or facsimile equipment. However, the prior art reader generally used in such type of apparatus has a limitation that the reader can read the original only when the surface of the original is low in regular reflectance. It can not read those originals having high regular reflectance.

For example, U.S. Pat. Nos. 3,994,582 and 4,124,296 have disclosed image-forming apparatus in which an original is placed directly on a platen glass and then the original is covered with an original pressing plate for reading the original. In this case, if the original is high in regular reflectance, a large portion of the illumination light incident on the original will be regular-reflected at a reflection angle corresponding to the incidence angle. Therefore, image sensor means in the apparatus does not receive sufficient light from the original. The result is under-exposure. When the image-forming apparatus is an electrophotographic copying machine, the under-exposure renders the obtained copy totally black. For a facsimile equipment, it is impossible to obtain any data concerning the image. This problem will be described in further detail with reference to FIGS. 1 and 2.

FIG. 1 is a schematic sectional view of an original reader according to the prior art used in an electrophotographic copying machine.

An original 1 is placed on a platen glass 2 and covered with an original pressing plate 13 having a white sheet 14. The original 1 is illuminated and scanned by illumination means (comprising an original illumination lamp 3 and a reflector 5). Said illumination means runs leftward and rightward under the platen glass while obliquely illuminating the original 1 from underneath.

If the original 1 is an ordinary paper sheet of high diffuse reflection factor, then the illumination light 8 will be diffuse-reflected upon the surface of the original. Therefore, in this case, the first mirror $6_1$ can receive a sufficient quantity of reflected light to form an image of the original. The first mirror $6_1$ reflects the light to the second mirror $6_2$ through which the reflected light enters a lens $6_4$. According to the principles of conventional electrophotographic processes, the reflected light is read in a photosensitive drum $6_3$ through image sensor means including the lens $6_4$.

However, if the original 1 has a high regular reflectance, a large portion of the illumination light 8 is regular-reflected upon the original surface as indicated by arrow 9. The first mirror $6_1$ can receive almost no reflected light from the original 1. Because of the shortage of exposure, there obtained only blackened image.

FIG. 2 shows the prior art original reader in a facsimile equipment. Like reference characters to FIG. 1 represent the same or corresponding elements which need not be further described.

Also, in this case, if the original 1 is of high regular reflectance, the reflected light 7 can scarcely reach image sensor means such as CCD through a bar lens $6_5$. Therefore, the facsimile equipment can not pick up images because of the lack of the effective illumination from the original.

SUMMARY OF THE INVENTION

Accordingly it is an object of the invention to provide an original reader for use in an image-forming apparatus which is able to read various originals.

It is another object of the invention to provide an original reader for an image-forming apparatus which is able to read even those originals which have a high regular reflectance.

It is a further object of the invention to provide an original reader for an image-forming apparatus which is able to read any kind of original irrespective of the degree of its regular reflectance.

To attain the above objects according to the invention there is provided an original reader comprising an original table; an original pressing plate which can be opened and closed relative the original table; a light diffusive member; illumination means for illuminating said original on the original table through said original table, and an image pickup means disposed to receive the reflected light from said original for reading said original.

Other and further objects, features and advantages of the invention will appear more fully from the following description taken in connection with the accompanying drawings.

DETAILED DESCRIPTION OF PREFERRED EMBODIMENT

Figure 1:
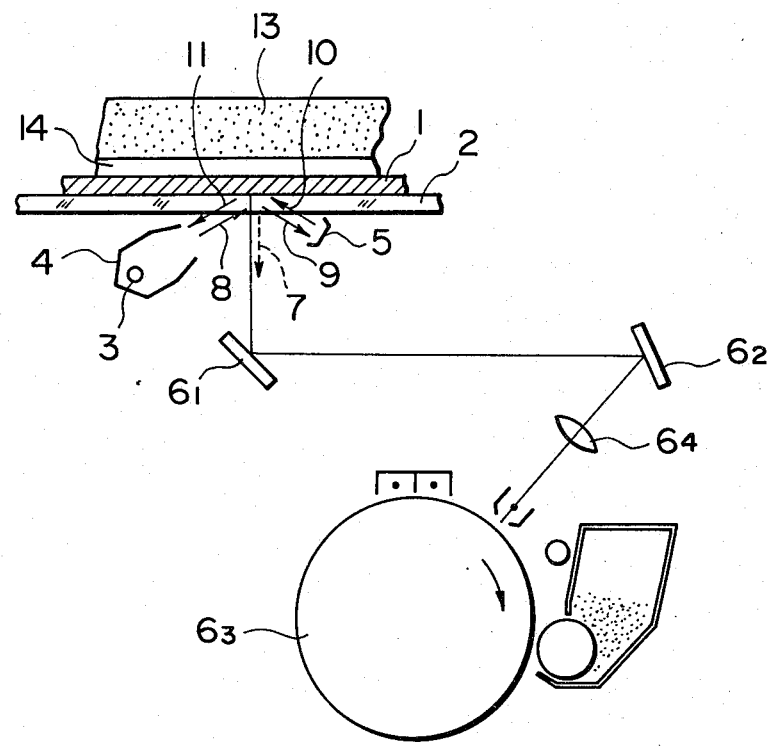
FIG. 1 is a schematic sectional view of an original reader according to the prior art used in an electrophotographic copying machine.
Figure 2:
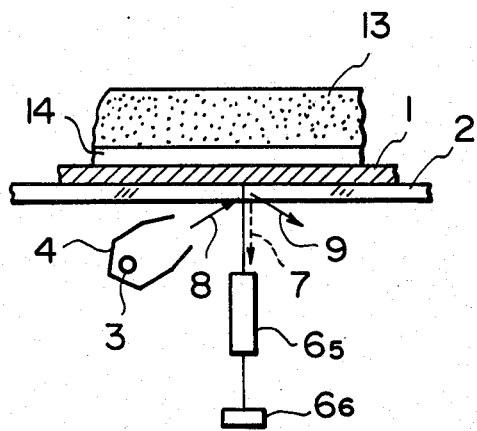
FIG. 2 is a schematic sectional view of an original reader according to the prior art used in a facsimile equipment.
Figure 3:
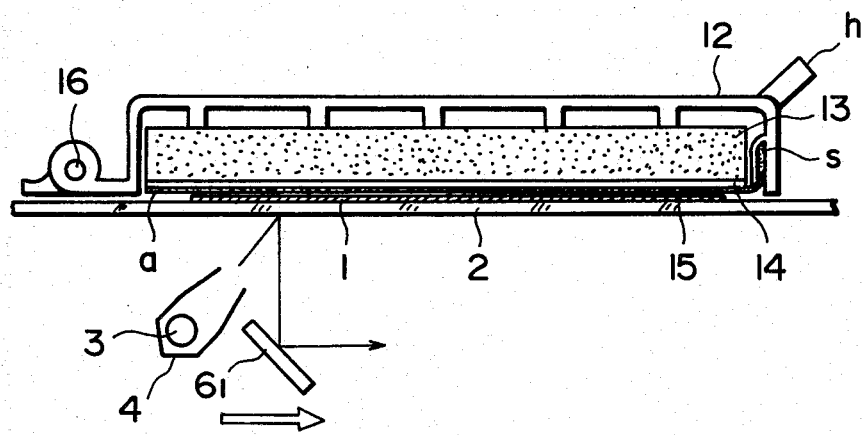
FIG. 3 is a schematic sectional view of an original reader showing an embodiment of the present invention.

Referring to FIG. 3 there is an embodiment of an original reader according to the present invention. Although not shown in the drawing, conventional illumination means and image pickup means are arranged under the original reader in the conventional manner.

Again, 1 is an original and 2 is an original table, that is, a platen glass on which the original is placed. The original 1 is covered with an original pressing plate pivotally mounted about a hinge 16. The pressing plate has a handle h with which the pressing plate can be opened and closed about the hinge 16 relative to the platen glass 2.

The original pressing plate comprises a molded cover 12, a cushion material layer 13, a white sheet 14 and a thin light diffusive sheet 15. The molded cover 12 forms the outer shell of the original pressing plate. The cushion material layer 13 is applied onto the inside of the mold cover 12. The cushion material layer may be formed of sponge or the like. The white sheet 14 is bonded to the underside surface of the cushion layer 13 by means of adhesives or other suitable bonding agent. The light diffusive thin sheet 15 which constitutes the light diffusive member of the invention, is provided on the underside surface of the white sheet 14. One side end a of the light diffusive sheet 15 is bonded to the corresponding side end of the white sheet 14. Another side of the diffusive sheet 15 is formed as a free end portion which can removably be inserted into a slot S formed directly under the handle h of the pressing plate. The thin diffusive film sheet 15 is used in the following manner:

When an ordinary original of low regular reflectance is to be read by the above original reader, the diffusive sheet 15 is brought into close contact with the underside surface of the white sheet 14 and the free end portion of the sheet 15 is engaged in the slot S. In this state, the pressing plate is closed to cover the original 1 on the platen 2 as in the case of the conventional original pressing plate (FIG. 3). The process of reading the original is entirely the same as that in the conventional reader and therefore need not be further described.

Figure 4:
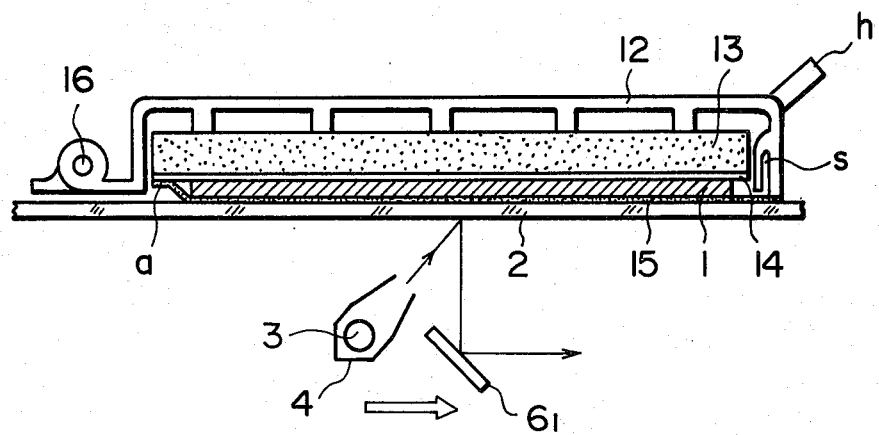
FIG. 4 is a similar view of the embodiment showing the mode of reading an original having high regular-reflected light component.

When an original of high regular reflectance is to be read, the free end portion of the diffusive sheet 15 is disengaged from the slot S and the pressing plate is opened while leaving the diffusive sheet 15 on the platen glass 2. The original 1 is placed on the upper side surface of the diffusive sheet 15 and then the pressing plate (the mold cover 12) is closed. In the closed position, therefore, the original 1 is sandwiched in between the white sheet 14 and the diffusive sheet 15 as shown in FIG. 4. After closing the pressing plate, a reading operation can be started in the conventional manner which is the same as in the case shown in FIG. 3.

Figure 5:
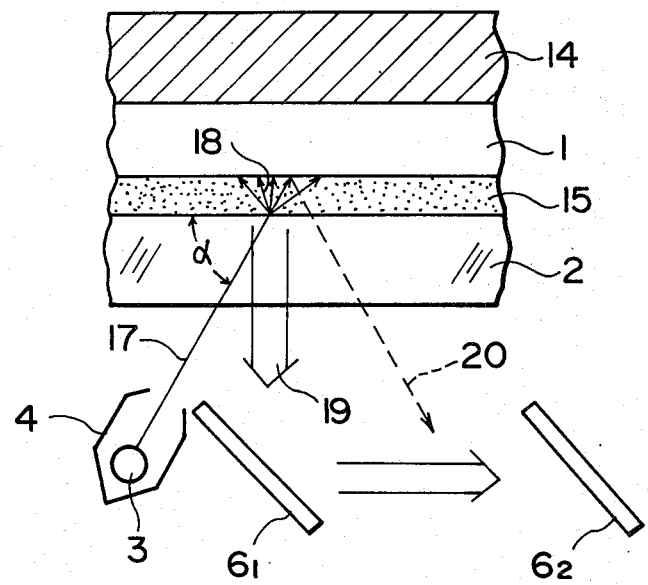
FIG. 5 illustrates the reflection of the illumination light in the mode shown in FIG. 4.

To illustrate the effect of the present invention the following example is given:

In this example, the above original reader according to the invention was used in the mode shown in FIG. 4. FIG. 5 is a partly enlarged view thereof.

The original 1 was an aluminum sheet on which characters were written in black and red. The image bearing surface of the aluminum sheet was substantially in the state of a mirror surface the regular reflectance of which was very high.

The original 1 was not placed on the platen glass 2 directly, but rather was placed above the light diffusive member 15 as shown in FIG. 5. The light diffusive member 15 used in this example was a sheet of tracing paper of about 50μ thick.

As the original illumination means there was used a halogen lamp 3 with a reflector 4. The original illumination means 3, 4 was so disposed as to illuminate the platen glass 2 at the angle of incidence $\alpha=45°$.

The reflected light from the original surface was guided to the photosensitive drum through first and second mirrors $6_1$ and $6_2$ moving at a speed ratio of 2:1 together with said illumination means. As the lens 64 interposed between the second mirror $6_2$ and the drum $6_3$ there was used a lens of focal length f=230 mm and effective F-number=5.2.

As seen from FIG. 5, the illumination light incident upon the platen glass 2 was diffused by the light diffusive sheet 15. As a result, the regular reflected light component 20 was very small. A large portion of the illumination light was reflected toward the first mirror $6_1$ and then guided to the photosensitive drum through the second mirror $6_2$ and the lens $6_4$. Thus, in this example, there was obtained a sufficient amount of exposure enough for image formation. The reading of the original was performed satisfactorily.

Figure 6:
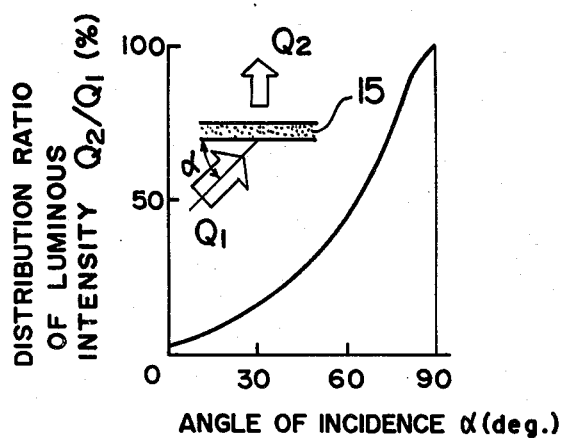
FIG. 6 is a light distribution characteristic curve of the light diffusive member used in the embodiment.
Figure 7:
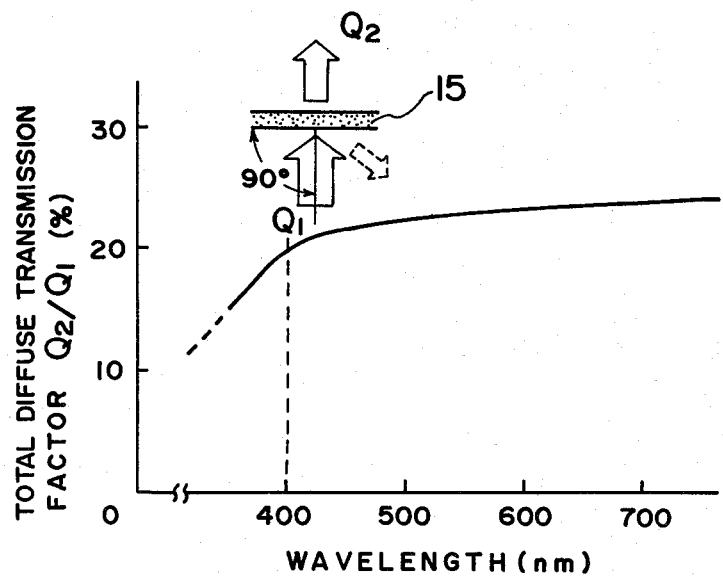
FIG. 7 is a diffuse transmission characteristic curve of the same member.

For the sake of explanation, the distribution characteristics of the luminous intensity of the tracing paper used as the light diffusive member of the above-described embodiment are shown in FIG. 6 and its transmission characteristics are shown in FIG. 7. In FIG. 6, $\alpha$ is the angle of incidence of the illumination light, $Q_1$ is the quantity of incident light and $Q_2$ is the quantity of transmitted light. The distribution characteristic of the luminous intensity of the diffusive sheet is represented by the ratio of $Q_2/Q_1$ with respect to the given incident angle $\alpha$ in FIG. 6. FIG. 7 shows the change of $Q_2/Q_1$ with the change of wavelength of the incident light at $\alpha=90°$. In the above example, the wavelength was in the range of 450 to 700 nm.

From FIG. 6 it is seen that the quantity of light ($Q_2$) transmitted to the original through the diffusive member gradually increases with the change of angle of incidence ($\alpha$) toward 90° at which $Q_2$ becomes the maximum. This means that the quantity of light received by the first mirror $6_1$ increases as the incident angle $\alpha$ approaches 90°. Therefore, in order to assure good reading of the original it is preferable that the incident angle of illumination from said illumination means 3, 4 be as near 90° as possible.

From FIG. 7 it is seen that a high and stable total diffuse transmission factor can be obtained for wavelengths longer than 400 nm when tracing paper is used as the light diffusive member.

If the light diffusive member is too thick, the distance to the original becomes too long to obtain good focus. In this case, there gives arise the problem of out-of-focus. Therefore it is essential to suitably select the thickness T of the diffusive member. It has been found that the thickness T of the diffusive member should be selected as to satisfy the following condition:

$$T < \frac{F \cdot n}{h} \quad (\neq 0)$$

wherein,
F is the effective F-number of the lens;
h is the necessary resolving power (line/mm); and
n is the refractive index of the diffusive member.

The light diffusive member useful in the invention is not limited to tracing paper only. Other sheets or plates made of acrylic resin or polyethylene containing $MgO_2$ or $BaSO_4$ admixed thereto also may be used. Further, there may be used sheets or plates made of transparent materials provided that one side surface of the sheet or plate is processed by grinding into a rough surface.

Figure 8:
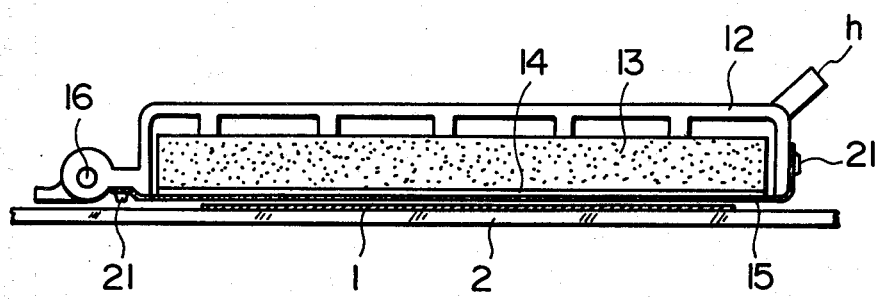
FIG. 8 is another embodiment wherein the light diffusive member is detachable.

FIG. 8 shows another embodiment of the light diffusive member 15. In this embodiment, the diffusive member 15 is not bonded to the white sheet 14 of the original pressing plate along one side edge thereof. The diffusive member 15 is formed as a separate member which is attachable to the molded cover 12 of the pressing plate by means of a hook 21 whenever it is required to use the diffusive member 15. For those originals which do not require the use of the diffusive member 15, it can be detached from the pressing plate very easily.

It is not always necessary to arrange the light diffusive member directly between the original and the platen glass. To prevent the diffusive member 15 from being made dirty or from being broken, a transparent protective sheet of 50–100μ thick may be applied to the diffusive sheet in such a manner as to cover the diffusive sheet with the protective sheet.

The sheet 14 bonded to the original pressing plate need not always white. In the case of a white sheet 14, it is very difficult for the original reader to clearly read the boundary between the white sheet 14 and an original having high regular reflectance. Therefore, where it is desired that the outline of the original should be clearly read by the original reader, a colored sheet may be used in place of the white sheet 14.

While the invention has been particularly shown and described with reference to preferred embodiments thereof, it will be understood by those skilled in the art that the foregoing and other changes in form and details can be made therein without departing from the spirit and scope of the invention.

What I claim is:

1. An original reader in an image-forming apparatus comprising:
    an original table on which an original is placed;
    an original pressing plate which can be opened and closed relative to said original table;
    a light diffusive member provided between said original table and said original pressing plate such that said light diffusive member can be interposed between an original to be read and the original table;
    illumination means for illuminating said original placed on said original table through said table; and
    image pickup means disposed to receive the reflected light from said original for reading said original.

2. An original reader according to claim 1, wherein said light diffusive member is provided on said original pressing plate in the manner that one end side of said light diffusive member is supported by said original pressing member and the other end side is removably engaged in said pressing member.

3. An original reader according to claim 1, wherein said light diffusive member is formed as a separate member attachable to and detachable from said original reader.

4. An original reader according to any one of claims 1 to 3, wherein the thickness T of said light diffusive member satisfies the following condition:

$$T < \frac{F \cdot n}{h} \quad (\neq 0)$$

wherein,
F is the effective F-number of the lens of said image pickup means;
h is the necessary resolving power; and
n is the refractive index of the diffusive member.

* * * * *